May 15, 1923.
M. ANSPACH
GLASS TILE FOR COVERING WALLS
Filed Jan. 5, 1922
1,454,842
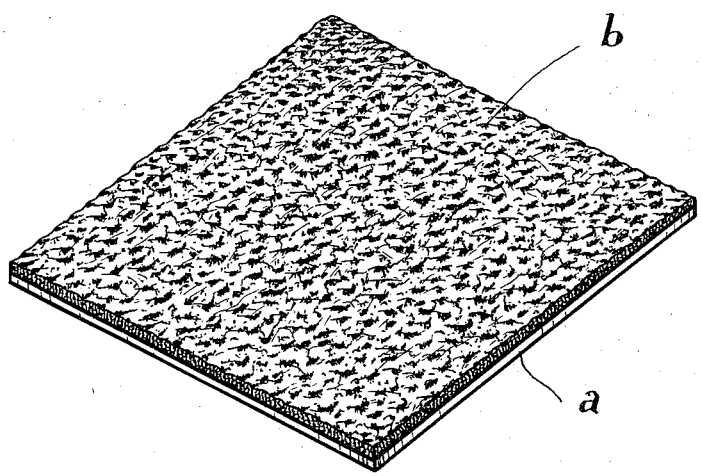
Inventor:
Marcel Anspach Patented May 15, 1923.

1,454,842

UNITED STATES PATENT OFFICE.

MARCEL ANSPACH, OF BRUSSELS, BELGIUM, ASSIGNOR TO SOCIETE ANONYME BELGE "SABER" ENTREPRISES & REVETEMENTS, OF BRUSSELS, BELGIUM, A COMPANY OF BELGIUM.

GLASS TILE FOR COVERING WALLS.

Application filed January 5, 1922. Serial No. 527,236.

*To all whom it may concern:*

Be it known that I, MARCEL ANSPACH, subject of Belgium, residing at 790 Chaussée de Wavre, Brussels, Belgium, have invented certain new and useful Improvements in Glass Tiles for Covering Walls, of which the following is a specification.

This invention relates to tiles made of opal or other glass for covering walls or partitions and has for its object means of rendering rough the back of the said tiles in order that they shall be easily fixed in position by means of a suitable mortar or plaster.

In order to enable tiles of this kind of being fixed in position, the means which have hitherto been used consist more especially either in providing the back of the tiles with fragments of glass which are fixed thereto by melting, or in coating the said back with a resinous material serving to fix thereon fragments of a porous mineral material.

In the first case, for fixing fragments of glass it is necessary to heat the tiles at high temperature whereby great waste results, and when the tiles are placed in position by means of mortar, the pieces of glass adhere to the latter by gripping and are liable to soon become detached owing to the vibrations to which the wall is subjected.

On the other hand the use of a resinous material has the drawback that the said material is easily liquefied by heat, therefore the tiles coated with it cannot be used in places which are exposed to heat nor utilized in hot climates.

According to the present invention the glass tiles are covered with a layer of a burnt earthy material similar to bricks, which adheres very strongly to the glass after a moderate heating and resist dampness without becoming soft, and heat without becoming friable, or becoming detached.

The said layer of burnt earth has a porosity which allows its being intimately united to a plaster, mortar or coating by means of which the glass tiles are usually fixed in position upon walls or partitions.

The earthy material which is used consists of a mixture of a clayey earth with oil, turpentine and resin in the form of varnish with addition of a siccative. It has been ascertained that ochre as clayey earth gives very good results and linseed oil is suitable for imparting the necessary resistance to dampness to the mixture after baking whilst facilitating the agglutination of the ingredient and the adherence of the mixture to the glass. The said agglunination and adherence are also helped by the resinous varnish and by the siccative which produces a thickening of the mixture and accelerates its baking.

The earthy composition which is obtained by the mixture of the said ingredients forms a paste with which one side of the glass tiles is first covered; then dried sand is sprinkled on to the layer of paste, the latter is covered with a second layer of the same paste and the whole is heated in a furnace of any kind at a temperature of about 100° C. for about ten minutes. A perfect adherence of the paste to the glass is thus obtained, the glass being thus covered with a rough and porous layer which is capable of adhering strongly to a suitable mortar or coating.

A glass tile provided with a coating according to the present invention is shown by way of example in the accompanying drawing. In the figure which is a perspective view, $a$ indicates the glass tile and $b$ the adhering coating which has a rough outer surface.

In order to obtain a paste giving good results it is advantageous to use the following proportions of the ingredients:

Ochre or other clayey earth, about 14 parts in volume;

Linseed oil, about 3 parts in volume;

Turpentine, about 2 part in volume;

Resinous varnish, about 1½ parts in volume;

Siccative, about 4 parts in volume.

About one third of the amount of ochre is first mixed with the amount of linseed oil and with one part of siccative. This mixture is well stirred and allowed to rest for a certain time in order that the oil and siccative shall penetrate well into the ochre. The remaining portions of the ochre, turpentine, varnish and remaining portion of the siccative are afterwards added by small successive quantities, the mixture being continuously stirred during the mixing and again stirred when used.

The paste thus obtained may be applied upon the glass by means of a brush. A rather thick layer is applied, then dried sand is sprinkled upon this layer and the whole is covered with a second layer of paste.

A baking for about ten minutes in a furnace which is heated at about 100° C., is sufficient for causing the paste to adhere to the glass in such a manner that it shall be made integral with the latter.

The glass tiles thus prepared are ready to be fixed upon a wall, ceiling etc., by means of the mortars or plasters which are usually employed for this purpose. These tiles are generally made of opal glass but the paste may also be applied to transparent glass to which it will impart its colour, and this colour may be modified by means of colouring matters which are added to the paste.

I claim:

1. A method of preparing glass tiles for wall coverings consisting in coating the back of said tiles with a paste containing a clayey earth, oil, turpentine, a resinous varnish and a siccative, and baking at a moderate temperature the tiles thus coated.

2. A method of preparing glass tiles for wall coverings consisting in coating the back of said tiles with a paste containing ochre and heating the tiles thus coated at a temperature of about 100° C.

3. A method of preparing glass tiles for wall coverings, consisting in coating the back of said tiles with a paste containing a mixture of a clayey earth, oil, turpentine, a resinous varnish and a siccative, and heating the tiles thus coated at a temperature of about 100° C. for about ten minutes.

4. A method of preparing glass tiles for wall coverings, consisting in coating the back of said tiles with a paste comprising about 14 parts in volume of ochre, 3 parts of linseed oil, 2 parts of turpentine, 1½ parts of resinous varnish and 4 parts of siccative, and heating the tiles thus coated at a moderate temperature.

5. A method of preparing glass tiles for wall coverings, consisting in mixing ochre with linseed oil and siccative, stirring the mixture and allowing the same to rest, adding thereto, by small successive quantities, ochre, turpentine, resinous varnish and siccative while continuously stirring the mixture, applying the paste thus obtained to the back of the tiles, and baking the coated tiles at a temperature of about 100° C.

6. A method of preparing glass tiles for wall coverings, consisting in coating the back of said tiles with a paste containing a mixture of a clayey earth, oil, turpentine, a resinous varnish and a siccative, sprinkling said coating with dry sand, applying thereon a second coating made of the same ingredients and baking the coated tiles at a moderate temperature.

7. As a new article of manufacture, a glass tile provided on one side with an adhering coating comprising a baked mixture of a clayey earth, oil, turpentine, a resinous varnish and a siccative.

In testimony whereof I have affixed my signature in presence of two witnesses.

MARCEL ANSPACH.

Witnesses:
H. T. E. VISSPATRIM,
F. J. LABARRE.